United States Patent
Tokumitsu

(10) Patent No.: US 8,525,870 B2
(45) Date of Patent: Sep. 3, 2013

(54) REMOTE COMMUNICATION APPARATUS AND METHOD OF ESTIMATING A DISTANCE BETWEEN AN IMAGING DEVICE AND A USER IMAGE-CAPTURED

(75) Inventor: Masayuki Tokumitsu, Kyoto (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 576 days.

(21) Appl. No.: 12/801,562

(22) Filed: Jun. 15, 2010

(65) Prior Publication Data
US 2011/0043598 A1 Feb. 24, 2011

(30) Foreign Application Priority Data
Aug. 20, 2009 (JP) .................. 2009-191349

(51) Int. Cl.
H04N 7/15 (2006.01)
G01J 5/04 (2006.01)
G02B 15/14 (2006.01)
G06K 9/00 (2006.01)

(52) U.S. Cl.
USPC ............ 348/14.08; 345/629; 348/42; 348/83; 348/159; 348/234; 348/349; 353/69; 359/676; 359/687; 359/705; 382/106; 382/159; 396/77; 396/78; 396/89; 600/424; 704/233

(58) Field of Classification Search
USPC ............... 348/14.08, 42, 83, 159, 139, 211.9, 348/222.1, 234, 333.01, 349; 359/676, 687, 359/705; 396/78, 77, 89; 345/629; 353/69; 382/106, 159; 600/424; 704/233
See application file for complete search history.

(56) References Cited

U.S. PATENT DOCUMENTS

| | | | | |
|---|---|---|---|---|
| 4,878,080 A * | 10/1989 | Takehana et al. | ............... | 396/78 |
| 5,777,668 A * | 7/1998 | Amano | ............... | 348/83 |
| 6,118,475 A * | 9/2000 | Iijima et al. | ............... | 348/42 |
| 6,118,946 A * | 9/2000 | Ray et al. | ............... | 396/89 |
| 6,483,536 B2 * | 11/2002 | Aoyama | ............... | 348/139 |
| 6,593,956 B1 | 7/2003 | Potts et al. | | |
| 6,809,877 B2 * | 10/2004 | Nagahara | ............... | 359/676 |
| 7,055,958 B2 * | 6/2006 | Tajima | ............... | 353/69 |
| 7,095,422 B2 * | 8/2006 | Shouji | ............... | 345/629 |
| 7,483,057 B2 * | 1/2009 | Grosvenor et al. | ........ | 348/211.9 |
| 7,555,141 B2 | 6/2009 | Mori | | |
| 7,609,955 B2 * | 10/2009 | Motomura et al. | ........ | 396/77 |
| 7,634,305 B2 * | 12/2009 | Davidson et al. | ........ | 600/424 |

(Continued)

FOREIGN PATENT DOCUMENTS

| | | |
|---|---|---|
| JP | 8223551 A | 8/1996 |
| JP | 2000-134598 A | 5/2000 |

(Continued)

OTHER PUBLICATIONS

Japanese Office Action dated May 29, 2013 with English translation.

*Primary Examiner* — Gerald Gauthier
(74) *Attorney, Agent, or Firm* — Rabin & Berdo, P.C.

(57) ABSTRACT

A remote communication apparatus for receiving the image of a remote user captured by an imaging device to show the image to another user includes a zoom controller for controlling a zoom ratio defining the angle of view of the imaging device, and an estimator for estimating a distance between the imaging device and the remote user on the basis of the zoom ratio of the imaging device.

11 Claims, 12 Drawing Sheets

(56) References Cited

U.S. PATENT DOCUMENTS

| | | | |
|---|---|---|---|
| 7,671,916 B2* | 3/2010 | Hashimoto | 348/333.01 |
| 7,715,112 B2* | 5/2010 | Shinohara et al. | 359/687 |
| 7,733,412 B2* | 6/2010 | Takayama | 348/349 |
| 7,756,299 B2* | 7/2010 | Higaki | 382/106 |
| 7,760,933 B2* | 7/2010 | Nagao et al. | 382/159 |
| 7,911,503 B2* | 3/2011 | Kobayashi | 348/222.1 |
| 7,974,841 B2* | 7/2011 | Bengtsson | 704/233 |
| 7,995,798 B2* | 8/2011 | Krupnik et al. | 382/106 |
| 8,106,966 B2* | 1/2012 | Chou et al. | 348/234 |
| 8,300,139 B2* | 10/2012 | Takayama | 348/349 |
| 2007/0035628 A1* | 2/2007 | Kanai | 348/159 |
| 2009/0034097 A1* | 2/2009 | Yakita | 359/705 |
| 2011/0043598 A1* | 2/2011 | Tokumitsu | 348/14.08 |

FOREIGN PATENT DOCUMENTS

| JP | 2002-516535 A | 6/2002 |
|---|---|---|
| JP | 2006-135837 | 5/2006 |
| JP | 2008042702 A | 2/2008 |

\* cited by examiner

REMOTE COMMUNICATION APPARATUS AND METHOD OF ESTIMATING A DISTANCE BETWEEN AN IMAGING DEVICE AND A USER IMAGE-CAPTURED

BACKGROUND OF THE INVENTION

1. Field of the Invention

The present invention relates to a remote communication apparatus, and more particularly to a remote communication apparatus for use in video conference. The present invention also relates to a remote communication method for such apparatus.

2. Description of the Background Art

In recent years, remote communication systems for communication for participants in remote locations have been actively researched. Such a remote communication system catches the voice of a participant by a microphone, captures the image of the participant by an imaging device, and transmits the voice and image to a remote location, where they are reproduced in real time, thus being able to convey the state of the participant to another participant in the remote location.

Japanese patent laid-open publication No. 223551/1996 to Shimada discloses a remote communication system implementing remote communication with the feeling of on-site conversation. Specifically, Shimada discloses a video conference system applicable to a remote location where plural participants stay, and directing a video camera to one of the participants who speaks more or most loudly to be considered as a predominant talker in the conversation. On the video monitor of the video conference system, the user can focally watch the image of the predominant participant talking in the remote location.

More specifically, the video conference system taught by Shimada includes, in addition to a video camera, a couple of microphones, one for capturing voice and the other for sensing the direction of a predominant speaker talking louder. The other, or direction-sensing microphone, captures voice, from which the maximum sound pressure is detected to determine which of the participants speaks most loudly, i.e. predominant talker. Then, according to the determination, the video camera and the one microphone, i.e. sound-collecting microphone, are controlled so as to be oriented to the direction of the predominant talker.

In the video conference system of Shimada, the video camera captures the prevailing talker, whose image is used to extract the edge or outline of a subject whose image is to be captured, while the video camera is controlled in its orientation so as to render the edge thus extracted match with a predetermined pattern. This enables the image of the predominant talker to be viewed at the proper position on the screen of a video monitor.

However, although the video conference system of the prior art can thus determine the detection of a predominant talker, it fails to detect the distance from the video camera to a predominant participant.

SUMMARY OF THE INVENTION

It is therefore an object of the present invention to provide a new and improved remote communication apparatus and a method therefor capable of estimating the distance of an imaging device to a participant to be captured by an imaging device.

In accordance with the present invention, a remote communication apparatus for receiving an image signal representing an image of a first participant captured by an imaging device to show the image to a second participant includes a zoom controller for controlling a zoom ratio defining an angle of view of the imaging device; and an estimator for estimating a distance between the imaging device and the first participant on the basis of the zoom ratio of the imaging device.

The estimator may estimate the distance between the imaging device and the first participant by assuming that the zoom ratio is adjusted so that, if an object of a predetermined size is virtually at a position of the first participant, an image of the object acquired by the imaging device would occupy a predetermined range in the whole image acquired by the imaging device.

The remote communication apparatus may further include a coordinate obtainer for using a pan and a tilt angle of the imaging device, and the distance between the imaging device and the first participant estimated by the estimator to obtain a coordinate position of the first participant in a coordinate system where the imaging device resides. The coordinate obtainer may obtain, rather than the coordinate position, a coordinate range of the first participant in the coordinate system.

The remote communication apparatus may further include a sound collector for capturing a voice of the second participant; a plurality of loudspeakers located around the first participant; and an output controller for transmitting the voice captured by the sound collector to at least one of the plurality of loudspeakers, wherein the output controller holds data of coordinates of the loudspeakers in the coordinate system and transmits the voice captured by the sound collector to one of the loudspeakers which has a coordinate position that is closest to the coordinate position of the first participant obtained by the coordinate obtainer.

The remote communication apparatus may further include a voice detector for detecting a volume level of the voice of the second participant captured by the sound collector, and the estimator may estimate the distance between the imaging device and the first participant on the basis of the volume level of the voice of the second participant detected by the voice detector in addition to the zoom ratio of the imaging device.

Also in accordance with the present invention, a method for remote communication includes the steps of controlling a zoom ratio defining an angle of view of the imaging device; and estimating a distance between the imaging device and the first participant on the basis of the zoom ratio of the imaging device.

Further in accordance with the present invention, a remote communication system includes an imaging device for capturing an image of a first participant; and the remote communication apparatus described above.

As described above, in accordance with the present invention, a distance between an imaging device and a participant whose image is to be captured by the imaging device can be estimated.

The inventive concept disclosed in the application may also be defined in ways other than in the claims presented below. The inventive concept may consist of several separate inventions particularly if the invention is considered in light of explicit or implicit subtasks or from the point of view of advantages achieved. In such a case, some of the attributes included in the claims may be superfluous from the point of view of separate inventive concepts. Within the framework of the basic inventive concept, features of different embodiments are applicable in connection with other embodiments.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 1:
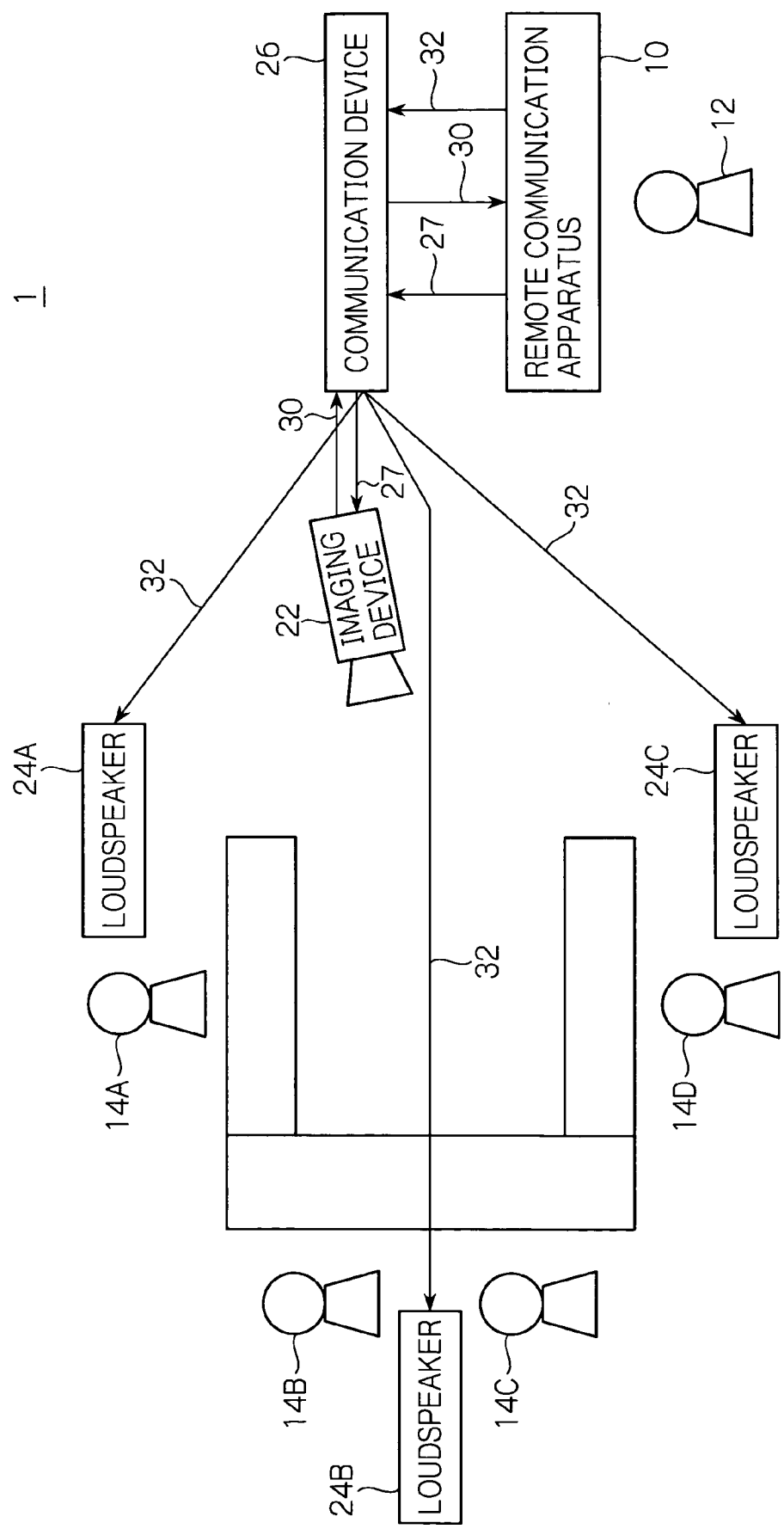
FIG. 1 schematically shows a specific configuration of an illustrative embodiment of a remote communication system in accordance with the present invention.

Well, reference will be made to the accompanying drawings to describe in detail a preferred embodiment of the present invention. In the following description and the accompanying drawings, like components or constituent elements are designated with the same reference numerals and repetitive descriptions thereon will be omitted. However, like components or constituent elements may sometimes be distinguished by letters following the same reference numerals but being different from each other. Plural components or constituent elements having substantially the same functional configuration may, if necessary, be distinguished in such a way as loudspeakers 24A, 24B and 24C, which may, however, be designated generally with just reference numerals 24.

First, reference will be made to FIG. 1 to describe the outline of a remote communication system 1 in accordance with a preferred embodiment of the present invention. FIG. 1 shows a configuration of the remote communication system 1 specifically implemented as a video conference system in accordance with the preferred embodiment. As seen from the figure, the remote communication system 1 in accordance with the preferred embodiment includes a remote communication apparatus 10 disposed to be manipulated by a user, or participant, 12 staying near the remote communication apparatus 10. The remote communication system 10 further includes an imaging device 22, and loudspeakers 24A, 24B and 24C, which are positioned near remote participants 14A to 14D staying at the distance from the user 12 and interconnected to a communication device 26. The remote communication system 1 thus structured is intended to allow the user 12 to communicate in real time with the remote participants 14A to 14D.

Figure 2:
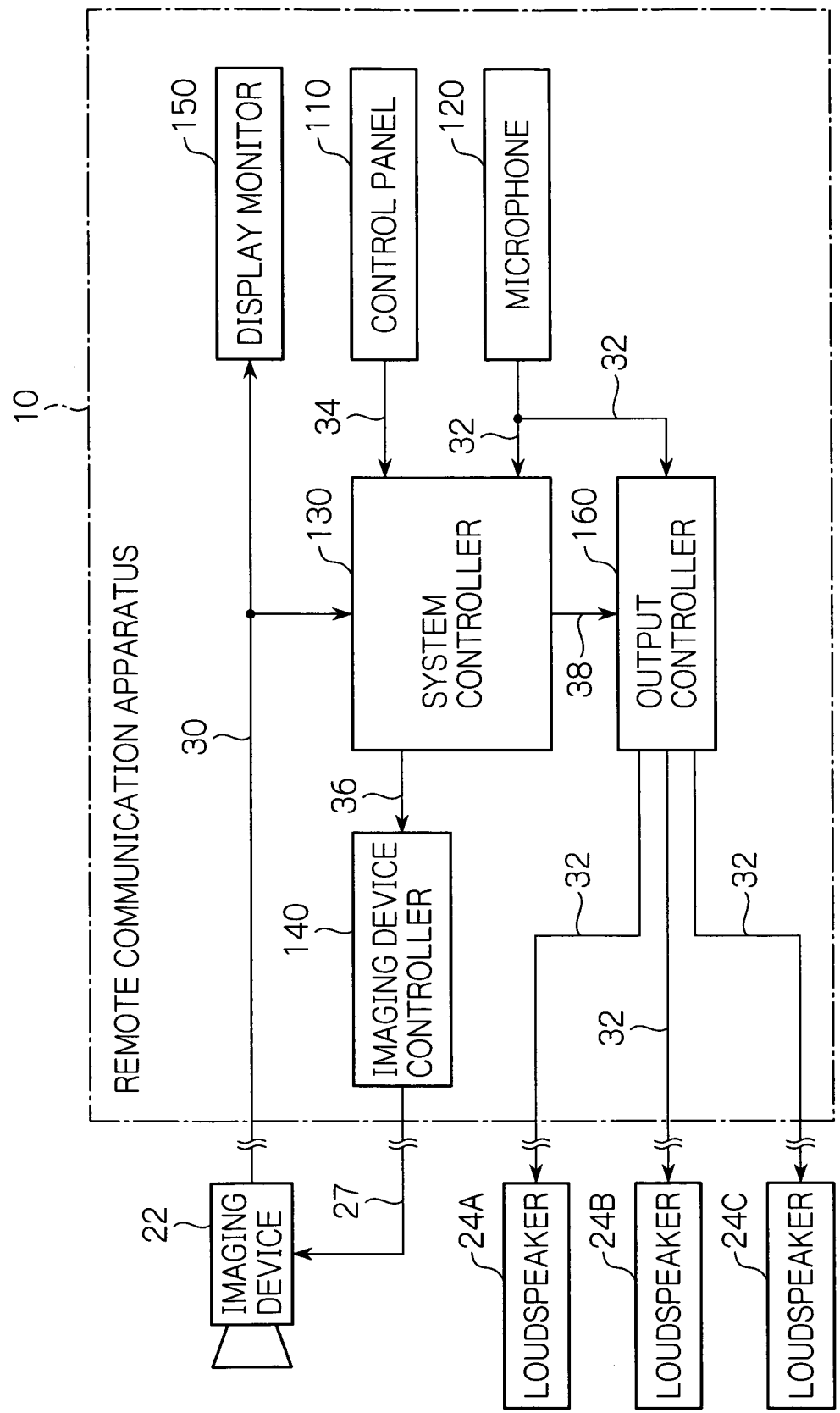
FIG. 2 is a functional block diagram showing a specific detailed configuration of the remote communication apparatus shown in FIG. 1.

The remote communication apparatus 10 is adapted to transmit to the communication device 26 a control signal 27 for controlling the orientation, such as panning and tilting, and the angle of view, i.e. zoom factor or ratio, of the imaging device 22, as well as to receive from the communication device 26 an image signal 30 representative of an image captured by the imaging device 22 in response to the control signal 27 to visualize the received image on its display unit 150, FIG. 2. This enables the user 12 on the remote communication apparatus 10 to watch the images of the remote participants 14A to 14D. The remote communication apparatus 10 is also adapted to transmit to the communication device 26 a voice signal 32 representing a voice or sound caught by a microphone 120, FIG. 2, from the user 12. Signals or data are designated with reference numerals of connections on which they are conveyed.

The communication device 26 is adapted to transmit the image signal 30 to and receive the voice signal 32 from the remote communication apparatus 10. For example, the communication device 26 transmits the image signal 30 produced by the imaging device 22 to the remote communication apparatus 10, and receives the voice signal 32 representing a voice captured from the user 12 from the remote communication apparatus 10 to transmit the voice signal 32 to the loudspeakers 24A, 24B and 24C. The communication device 26 may symbolically depicted as a single block 26, but may include any telecommunications circuits and/or networks.

The imaging device 22 may advantageously be a video camera adapted to be responsive to the control signal 27 transmitted from the remote communication apparatus 10 to capture the image of a participant 14 specifically with its orientation and angle of view controlled.

The loudspeakers 24A, 24B and 24C are adapted to receive the voice signal 32 received by the communication device 26 from the remote communication apparatus 10 to produce the inputted voice signal 32 in the form of audible sound. This enables the participants 14A to 14D to hear the voice uttered by the user 12 remote therefrom.

Although being not depicted in FIG. 1, the remote communication system 1 may include microphones for capturing the voice of the participants 14A to 14D, and display devices for displaying the image of the user 12 captured by the remote communication apparatus 10.

FIG. 2 is a schematic functional block diagram showing a configuration of the remote communication apparatus 10 in accordance with this embodiment. As shown in the FIG. 2, the remote communication apparatus 10 includes an control panel 110, a microphone 120, a system controller 130, an imaging device controller 140, a display unit 150 and an output controller 160, which are interconnected as illustrated. In the figure, the communication device 26 is omitted just for simplification from depiction between the remote communication device 10 and the imaging device 22 and loudspeakers 24A, 24B and 24C. Also omitted are other functional blocks and/or interconnections not directly necessary for understanding the invention.

The control panel 110 is manipulable by the user 12 to output a signal 34 corresponding to a content of the user's operation to the system controller 130. The user's operation on the control panel 110 is exemplified by a key operation for controlling the orientation or attitude and angle of view of the imaging device 22.

Figure 3:
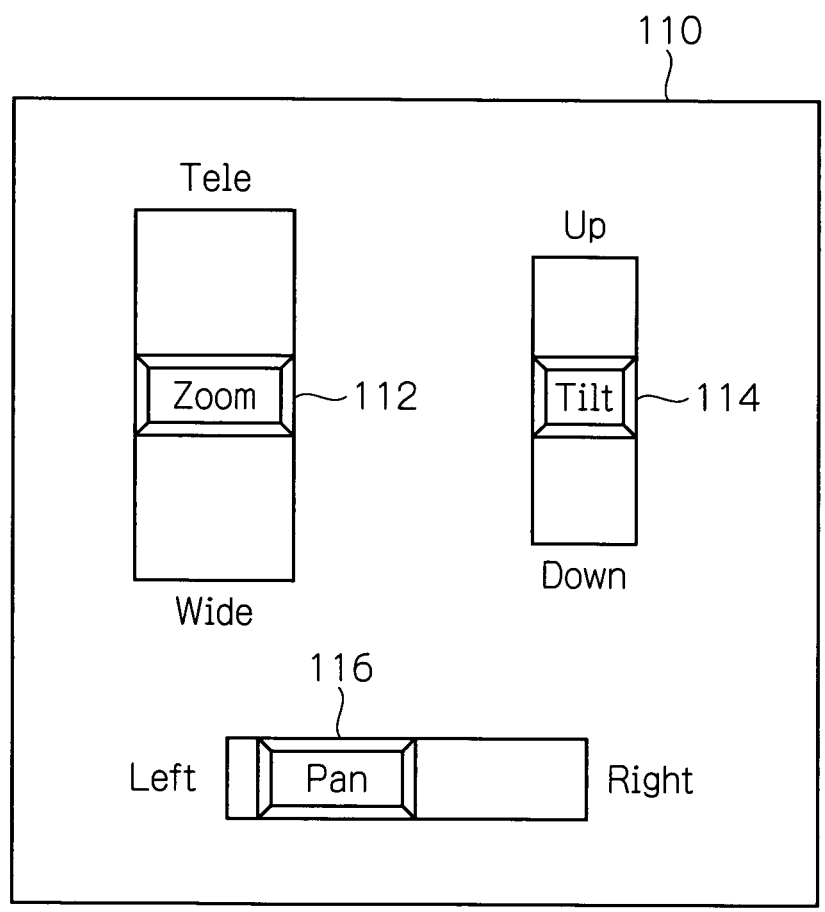
FIG. 3 shows in a plan view an exemplary layout of the control panel shown in FIG. 2.

FIG. 3 schematically shows in a plan view an exemplary layout of the control panel 110. As seen from FIG. 3, the control panel 110 specifically includes thereon a zoom switcher 112, a tilt switcher 114 and a pan switcher 116.

The zoom switcher 112 has a knob slidable in the up and down direction by the user's manipulation to make the imaging device 22 zoom in and out. The zoom switcher 112 outputs, when manipulated, to the system controller 130 operational information 34 representing the manipulation and the zooming position of the knob of the zoom switcher 112.

Also, the tilt switcher 114 has a knob slidable in the up and down direction by the user's operation to make the imaging device tilt. The tilt switcher 114 outputs, when manipulated, to the system controller 130 operational information 34 representing the manipulation and the tilting position of the knob of the tilt switcher 114.

Similarly, the pan switcher 116 has a knob slidable in the left and right direction by the user's operation to make the imaging device pan. The pan switcher 116 outputs, when manipulated, to the system controller 130 operational information 34 representing the manipulation and the panning position of the knob of the pan switcher 116.

FIG. 3 merely shows an example of control panel 110. Therefore, the control panel 110 may be, for example, in the form of touch-screen, push-buttons, changeover switches, toggle switches or dial switchers. Furthermore, the control panel 110 may include, for example, an optical sensor or a wireless receiver for receiving an infrared or radio-wave signal emitted by a remote control handset in response to the user's operation.

Returning to FIG. 2, the microphone 120 is a sound capturing unit for receiving the voice of the user 12 on the remote communication apparatus 10. The microphone 120 is connected to the system controller 130 and the output controller 160, and transduces the captured voice of the user 12 to the corresponding electric signal 32, which is outputted to the system controller 130 and the output controller 160.

The system controller 130 is adapted to be operative in response to the information signal 34 provided from the control panel 110 and the microphone 120 to produce from the operational information 34 control amounts 36 such as a zooming factor or ratio, a tilt angle and a pan angle to the imaging device controller 140. The system controller 130 is also responsive to the information signal 34 to select appropriate one of the loudspeakers 24A, 24B and 24C and send an information signal 38 representing the selected loudspeaker 24 to the output controller 160. A detailed configuration of the system controller 130 will be described later with reference to FIGS. 5 to 13.

The imaging device controller 140 is adapted to be responsive to a control signal representing the control amounts 36 from the system controller 130 to control the imaging device 22. In this embodiment, the imaging device controller 140 receives the control amount 36 from the system controller 130, and outputs, according to the received control amounts 36, the control signal 27 for controlling the orientation, e.g. the pan and tilt angles, and the angle of view of the imaging device 22 defined by the zoom ratio. In other words, the imaging device controller 140 functions as a zoom, a tilt and a pan controller. The imaging device 22 is responsive to the control signal 27 from the imaging device controller 140 to capture the image of the participants 14.

The display monitor 150 is adapted to receive the image signal 30 representing the image captured by the imaging device 22 to display the image to the user 12 on the remote communication apparatus 10. Therefore, the user 12, while checking the image on the display monitor 150, can operate the control panel 110 to control the imaging device 22. The display monitor 150 may be, for example, a CRT (Cathode Ray Tube) display device, an LCD (Liquid Crystal Display) device, or an OLED (Organic Light Emitting Diode) device.

The output controller 160 is adapted to be responsive to the control output 38 from the system controller 130 to transmit the voice signal 32 inputted from the microphone 120 to at least one of the loudspeakers 24A, 24B and 24C which is selected by the system controller 130. Specifically, each of the loudspeakers 24A, 24B and 24C has its own address specific thereto allotted. The output controller 160 transmits the voice signal 32 to the loudspeaker 24 having its address corresponding to that designated by the information signal 38 from the system controller 130.

Figure 4:
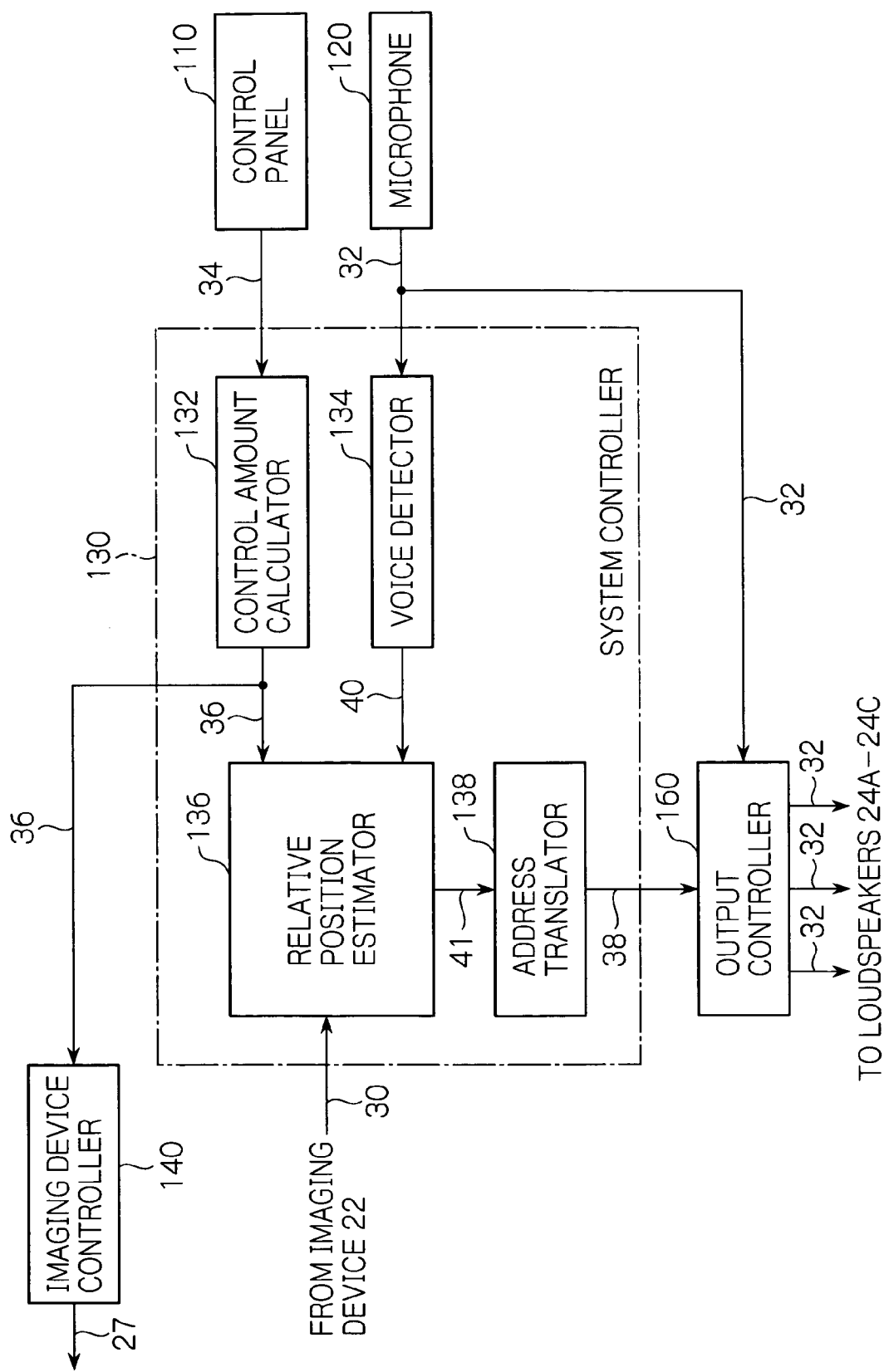
FIG. 4 shows a specific detailed configuration of the system controller shown in FIG. 2.

Now, with reference to FIG. 4 showing a detailed configuration of the system controller 130, the system controller 130 comprises a control amount calculator 132, a voice detector 134, a relative position estimator 136, and an address translator 138, which are interconnected as depicted.

The control amount calculator 132 is adapted to be responsive to the input 34 from the control panel 110 to calculate the control amounts 36 on the imaging device 22. Specifically, the control amount calculator 132 has data stored in advance which define the relationships between the positions of the knobs of the zoom switcher 112, tilt switcher 114 and pan switcher 116, and the zoom ratio, tilt angle and pan angle, respectively, of the imaging device 22, and the control amount calculator 132 converts the input 34 from the control panel 110 to the control amounts 36 such as the zoom ratio, tilt angle and pan angle according to the relationships stored. The control amount calculator 132 outputs the control amounts 36 to the imaging device controller 140 and the relative position estimator 136.

The voice detector 134 is adapted to determine whether or not the voice signal 32 inputted from the microphone 120 includes a word or words hailing another participant. For example, when the word "Hey" is registered as a word hailing another participant, the voice detector 134 may be responsive to the voice sounding "Hey" in the voice signal 32 inputted from the microphone 120 to determine that the voice signal 32 is of a hail to one or ones of the participants 14A to 14D. When the voice signal 32 inputted from the microphone 120 is determined as including a hail to another participant, the voice detector 134 outputs a starting signal 40 to cause the relative position estimator 136 to start its processing.

The relative position estimator 136 is adapted to use the control amounts 36 inputted from the control amount calculator 132 to estimate the relative position of the hailed participant from the imaging device 22 to produce an information signal 41 representing the estimated relative position. For example, the pan and tilt angles may be used to determine the direction of the hailed participant from the imaging device 22. However, by simply using the pan and tilt angles, the distance of a hailed participant from the imaging device 22 would not be determined. Therefore with the illustrative embodiment, the relative position estimator 136 uses the zoom ratio to estimate the distance of a hailed participant from the imaging device 22.

Figure 5:
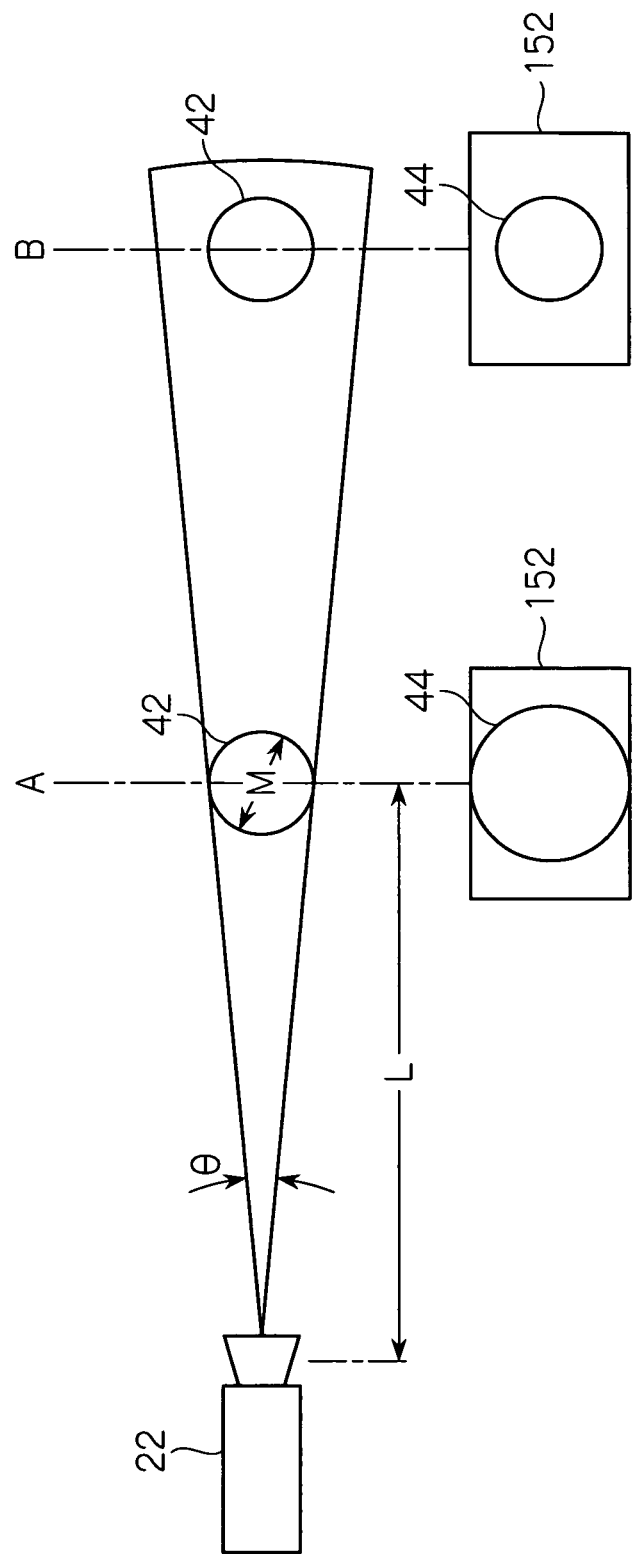
FIGS. 5 and 6 are plan views showing the relationship between the angle of view of the imaging device, the position of an object to be shot by the imaging device, and the image of the object captured by the imaging device.

Specifically, the relative position estimator 136 first finds an angle of view θ, FIG. 5, on the basis of the zoom ratio included in the control amounts 36. The relative position estimator 136 may be adapted to hold a look-up table defining the relationship between the values of zoom ratio and the values of angle of view so as to reference the table to thereby find a value of angle of view θ corresponding to an input value of zoom ratio.

Next, the relative position estimator 136 estimates, on the basis of the angle of view θ, the distance of the hailed participant from the imaging device 22. Specifically with reference to FIG. 5, the relative position estimator 136 assumes that the user 12 adjusts the zoom ratio, i.e. angle of view θ, of the imaging device 22 so that, if a certain object having a predetermined size, e.g. sphere 42 having its diameter equal to M cm, is virtually at the position of a hailed participant, the width of an image of the sphere 42 acquired by the imaging device 22 would occupy a portion a % of the width of the screen 152 of the monitor 150. Now, the relationship between the angle of view θ and the distance L cm is represented by the following expression (1):

$$M = \left(L \times 2\tan\frac{\theta}{2}\right) \times \frac{a}{100} \tag{1}$$

Therefore, the relative position estimator 136 estimates the distance L according to the following expression (2):

$$L = \frac{50 \times M}{a \times \tan\frac{\theta}{2}} \tag{2}$$

Therefore, for example, when the diameter M of the sphere 42 is equal to 30 cm, and the ratio a in width of the sphere image 44 to the screen 152 is equal to 50%, the distance L is represented by the following expression (3):

$$L = \frac{30}{\tan\frac{\theta}{2}} \tag{3}$$

Figure 6:
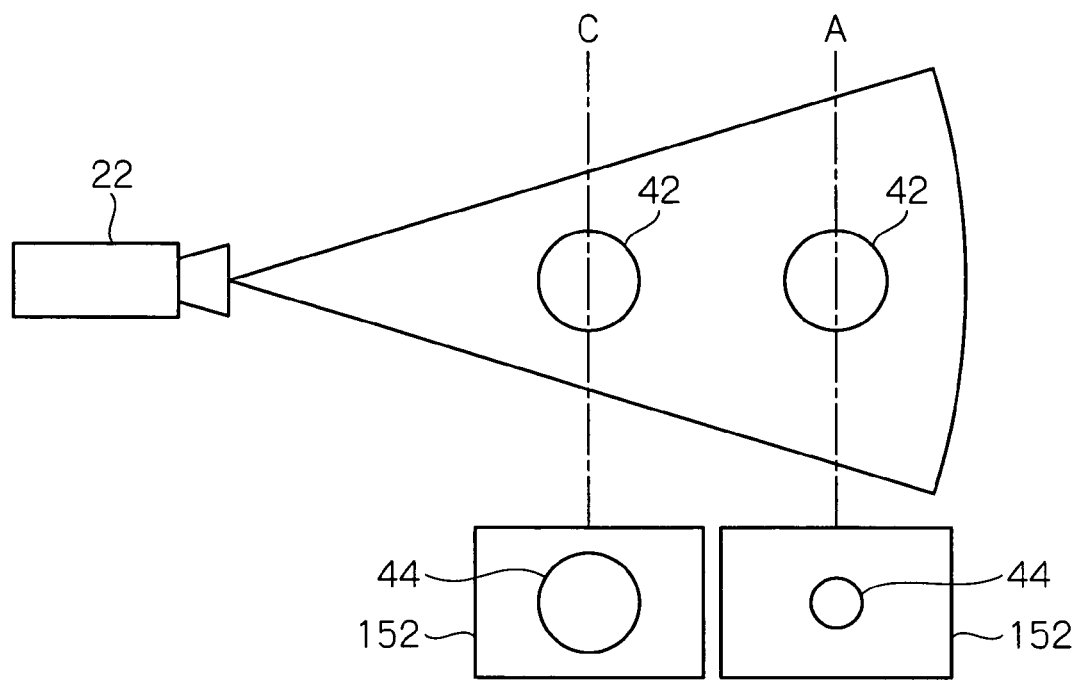

FIGS. 5 and 6 show the relationship between the angle of view θ of the imaging device 22, the distance of the sphere 42 from the imaging device 22, and the size of the image 44 of the sphere 42. When the ratio a in width of the sphere image 44 to the screen 152 is equal to 50%, for the angle of view θ shown in FIG. 5, the distance L estimated by the relative position estimator 136 is equal to a distance between a position B and the imaging device 22. Similarly, when the ratio a in width of the sphere image 44 to the screen 152 is equal to 50%, for the angle of view shown in FIG. 6 which is larger than that in FIG. 5, the distance L estimated by the relative position estimator 136 is equal to a distance between a position C and the imaging device 22 which is shorter than that in FIG. 5.

Meanwhile, the relative position estimator 136 may hold a table defining the relationship between the zoom ratio and the distance, and reference the table to thereby estimate the distance between a hailed participant and the imaging device 22.

Figure 7:
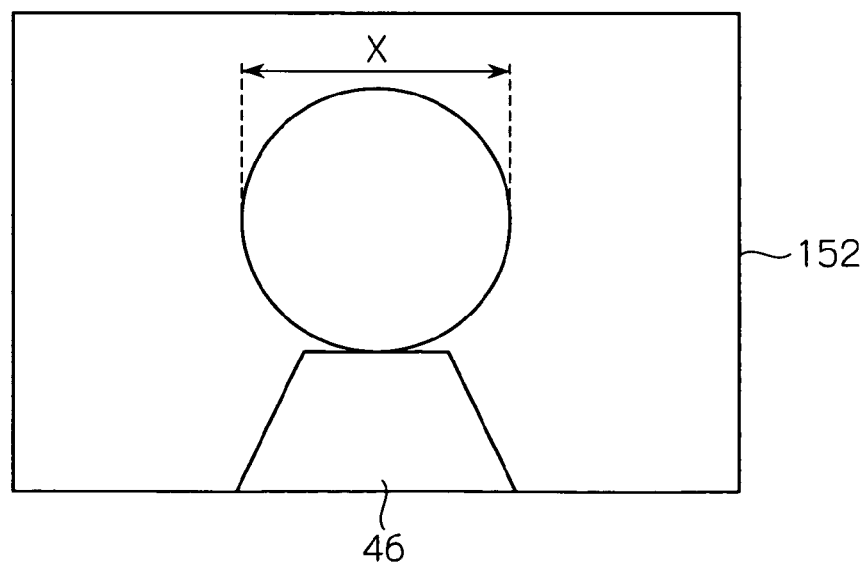
FIG. 7 shows in a plan view an example of image field captured by the imaging device shown in FIG. 1 and displayed on the screen of the display monitor shown in FIG. 2.

Additionally, a manner for estimating the distance between a hailed participant and the imaging device 22 is not limited to the manner using the above-described expressions. For example, the relative position estimator 136 may be adapted to receive and analyze an image captured by the imaging device 22 to thereby estimate the distance L between a hailed participant 14 and the imaging device 22. With reference to FIG. 7, a specific description will be made below.

FIG. 7 shows in a plan view a specific example of image 46 of a participant 14 captured by the imaging device 22 and carried on the image signal 30 to be displayed on the screen 152 of the display monitor 150. In FIG. 7, the width of the head of the participant image 46 is represented by x. The relative position estimator 136 in this case further obtains from the image signal 30 the image field 152 captured by the imaging device 22 and analyzes the latter to obtain the value of width x. This width x depends on the zoom ratio or the angle of view θ. Therefore, assuming that the actual width of the head of the participant is equal to a value y, the relative position estimator 136 can estimate the distance L between the hailed participant and the imaging device 22 using a ratio a % of the width x to the width of the screen 152. In this case, the relationship between the angle of view θ and the distance L is represented by the following expression (4):

$$\frac{y}{L \times 2\tan\frac{\theta}{2}} = \frac{a}{100} \tag{4}$$

Therefore, the relative position estimator 136 estimates the distance L according to the following expression (5):

$$L = \frac{50y}{a \times \tan\frac{\theta}{2}} \tag{5}$$

Returning to FIG. 4, the address translator 138 is adapted to select one of the loudspeakers 24A, 24B and 24C which corresponds to the relative position 41 estimated by the relative position estimator 136, and output an address 38 of the selected loudspeaker 24 to the output controller 160. Specifically, the address translator 138 holds data of positions, i.e. spatial coordinates, of the loudspeakers 24A, 24B and 24C in a coordinate system 48 of the remote location including the imaging device 22 and their addresses for communication. The address translator 138 also has the function of a coordinate obtainer for obtaining a coordinate in the remote location of a hailed participant on the basis of the relative position 41 (the pan angle, the tilt angle, and the distance L from the imaging device 22) estimated by the relative position estimator 136.

Figure 8:
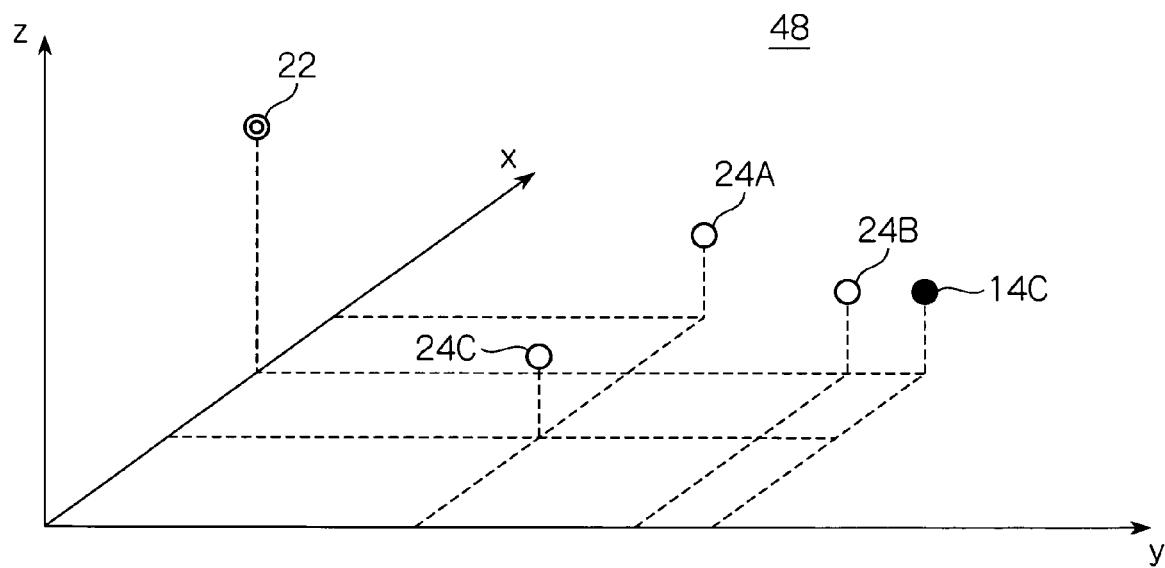
FIG. 8 shows in a perspective view an example of coordinate system in the remote location shown in FIG. 1.

Thus, the address translator 138 can calculate a distance in the space coordinate system between the hailed participant and each loudspeaker 24, and select one of the loudspeakers 24 that is closest to the hailed participant. With reference to FIG. 8, a more specific description will be made below.

FIG. 8 shows a specific example of coordinate system 48 of the location remote from the remote communication apparatus 10. The address translator 138 holds data of the positions, i.e. coordinates, of the loudspeakers 24A, 24B and 24C in the coordinate system 48 shown in FIG. 8. When the participant 14C is hailed, the address translator 138 obtains the coordinate position of the participant 14C as shown in FIG. 8 on the basis of the relative position 41 estimated by the relative position estimator 136.

Furthermore, the address translator 138 calculates the distance between the coordinate positions of the participant 14C and each of the loudspeakers 24A, 24B and 24C. Now, since the loudspeaker 24B is closest in coordinate position to the participant 14C in this example as shown, the address translator 138 selects the loudspeaker 24B and outputs the address 38 of the loudspeaker 24B to the output controller 160.

The above description is directed to an exemplified case of selecting the loudspeaker 24C that is closest to a hailed participant, but this embodiment is not limited to this exemplified case. For example, the address translator 138 may select a predetermined number of loudspeakers 24 for a hailed participant.

The address translator 138 may be adapted to determine an allocation of volume level to the respective loudspeakers 24 depending on the distance in the spatial coordinate system 48 of a hailed participant to each loudspeaker 24. For example, the address translator 138 may increase the allocation of volume levels for the loudspeakers 24 closer to a hailed participant, and decrease the allocation of volume levels for the loudspeakers 24 more distant from the hailed participant.

Furthermore, the address translator 138 may provide the output controller 160 with the allocation of volume level of each loudspeaker 24 together with the address of that loudspeaker 24 associated therewith.

The above description is directed to an exemplified case of estimating the distance between a hailed participant and the imaging device 22 on the basis of the zoom ratio, but the embodiment is not limited to this exemplified case. As a modification, the voice detector 134 may be adapted to measure the volume level of the voice signal 32, and the relative position estimator 136 may be adapted to use the volume level of the voice signal 32 detected by the voice detector 134 to correct the distance estimated on the basis of the zoom ratio.

Figure 9:
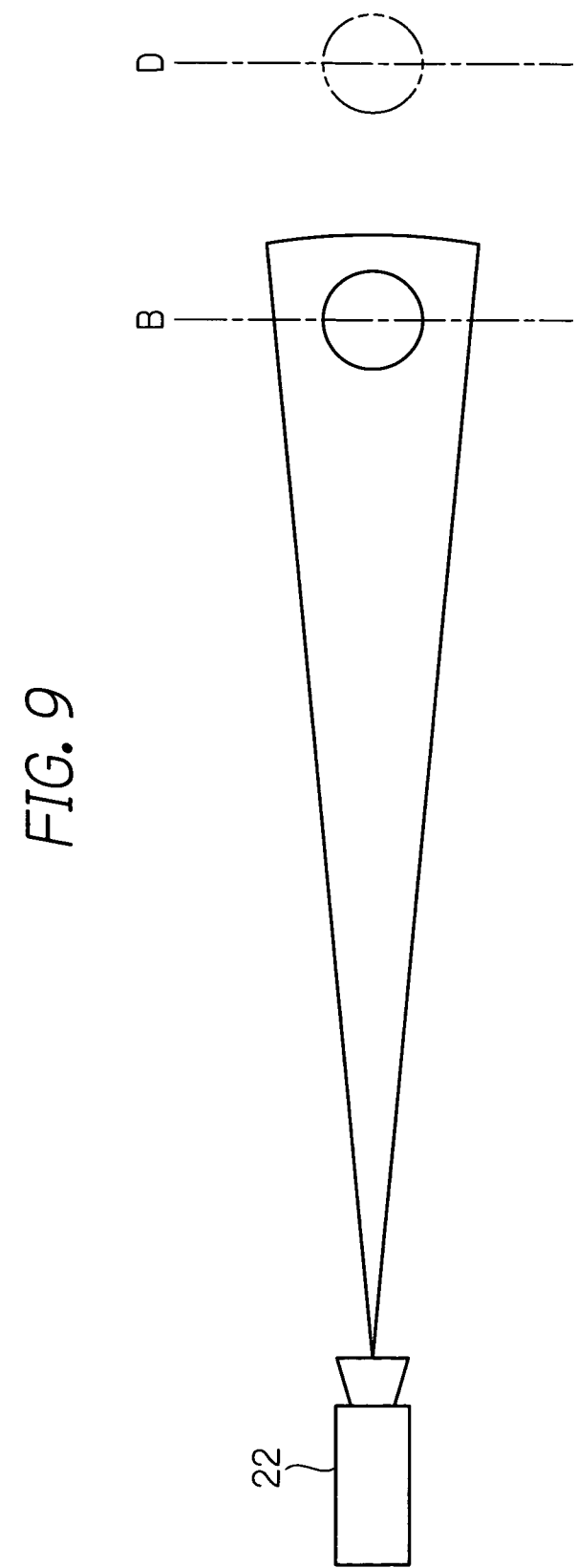
FIGS. 9 and 10 are plan views, like FIGS. 5 and 6, showing an example of correction for a distance estimated by the relative position estimator shown in FIG. 4.
Figure 10:
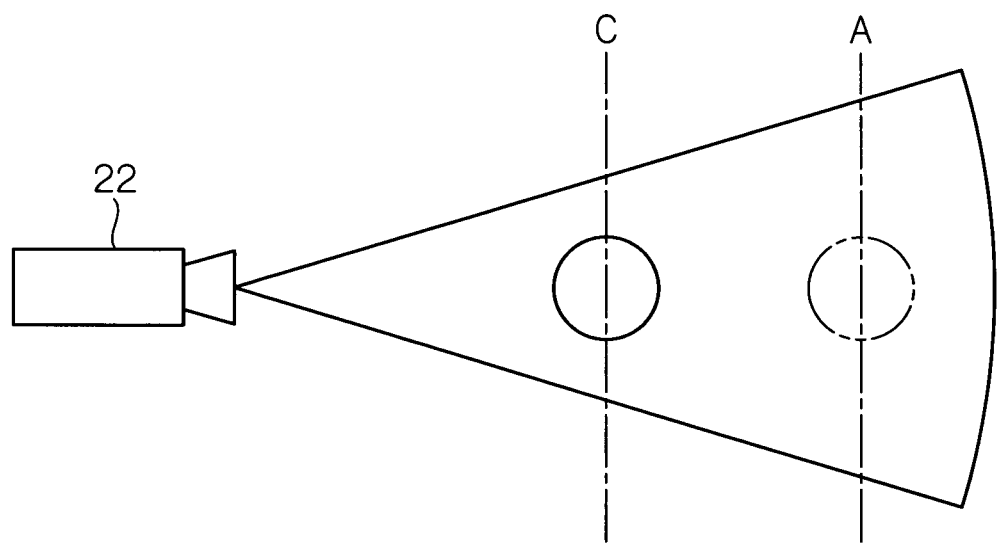

Specifically, when a voice signal 32 detected by the voice detector 134 is higher in volume level than a predetermined reference value, it is considered to be hail to a participant who stays more distant from the imaging device 22 than estimated based only on the zoom ratio. In this case, the relative position estimator 136 may correct the distance estimated on the basis of the zoom ratio to a longer distance. With reference to FIGS. 9 and 10, a more specific description will be made below.

FIGS. 9 and 10 show an example of correction for estimated distance. The relative position estimator 136, as shown in FIG. 9, when estimating that a participant exists at a position B whose distance from the imaging device 22 is defined on the basis of the zoom ratio in the case of the volume level of the voice signal 32 detected by the voice detector 134 being higher than the reference value, may correct the estimated position of the hailed participant to a position D that is more distant from the imaging device 22 than the position B.

Similarly, as shown in FIG. 10, when estimating that a participant exists at a position C whose distance from the imaging device 22 is defined on the basis of the zoom ratio in the case of the volume level of the voice signal 32 detected by the voice detector 134 being higher than the reference value, the relative position estimator 136 may correct the estimated position of the hailed participant to a position A that is more distant from the imaging device 22 than the position C.

Meanwhile, when the volume level of the voice signal 32 detected by the voice detector 134 is lower than the reference value, the relative position estimator 136 may correct the distance estimated on the basis of the zoom ratio to a shorter distance.

Figure 11:
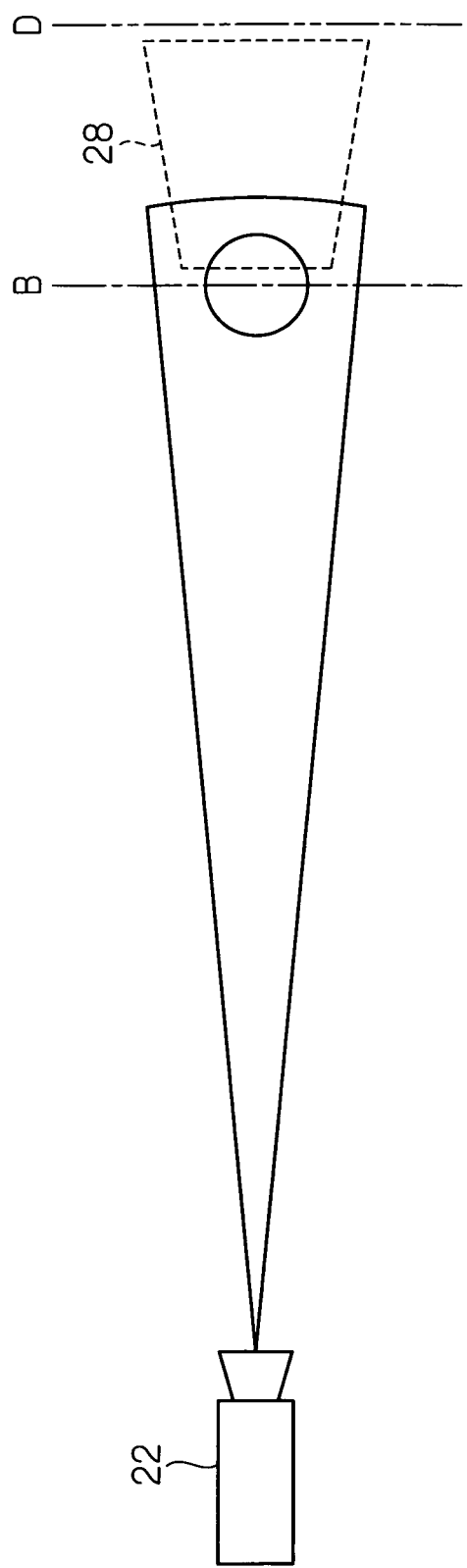
FIGS. 11 and 12 are plan views, like FIGS. 5 and 6, showing examples of range hailed by the user of the remote communication apparatus shown in FIG. 1.
Figure 12:
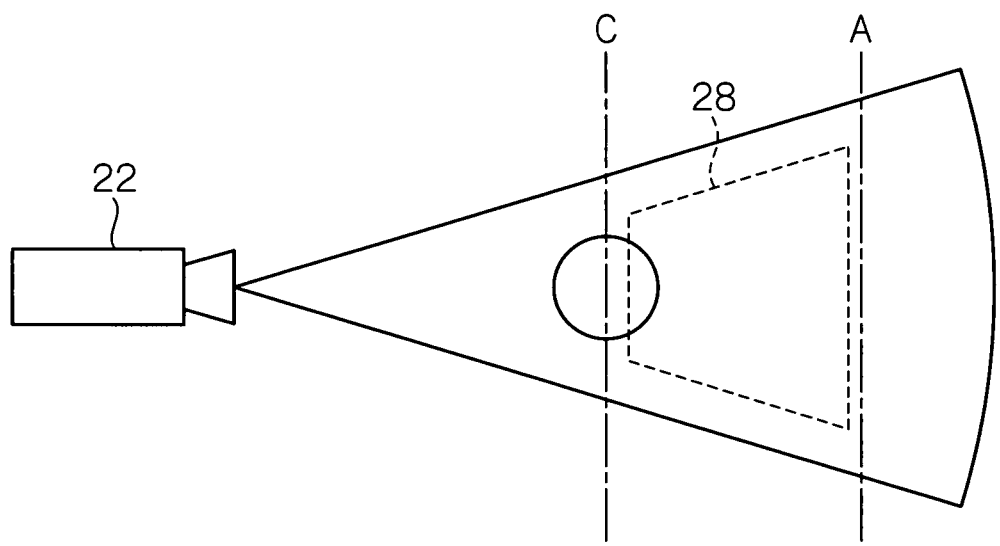

The relative position estimator 136 may also be adapted to estimate a hailed range instead of the relative position of a hailed participant. In this case, the address translator 138 may select a loudspeaker 24 residing in the hailed range, and output the address 38 of the selected loudspeaker 24 to the output controller 160. With reference to FIGS. 11 and 12, a specific description will be made below.

FIGS. 11 and 12 show specific examples of hailed range. The relative position estimator 136 may be adapted to estimate as a hailed range a range 28 between the positions B and D, as shown in FIG. 11, estimated on the basis of the zoom ratio. Similarly, the relative position estimator 136 may estimate as a hailed range a range 28 formed, as shown in FIG. 12, between the positions C and A estimated on the basis of the zoom ratio.

Figure 13:
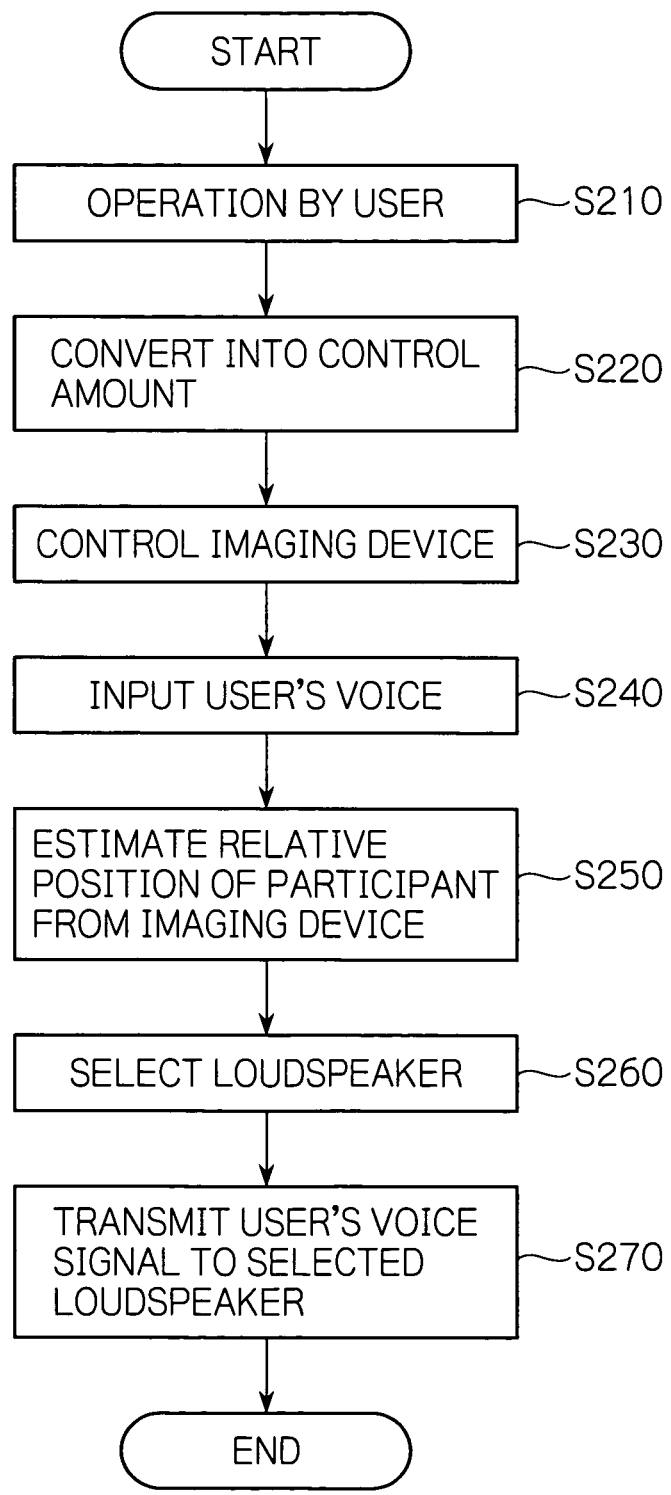
FIG. 13 is a flowchart useful for understanding the operation of the remote communication apparatus shown in FIG. 1.

Next, with reference to FIG. 13, the operation of the remote communication apparatus 10 in accordance with this embodiment will be described. FIG. 13 is a flowchart useful for understanding the operation of the remote communication apparatus 10. At first, the user 12 operates the control panel 110 in order to control the imaging device 22 (step S210). Then, the content 34 of the user's operation on the operating panel 110 is inputted into the control amount calculator 132 to be converted to the control amounts 36 such as the zoom ratio, the tilt angle and the pan angle (S220).

Then, the control amounts 36 are inputted into the imaging device controller 140, which in turn outputs the control signal 27 to the imaging device 22 to thereby control the imaging device 22 according to the control amounts 36 (S230). This causes the image in the range intended by the user 12 to be captured by the imaging device 22 to be viewed on the display monitor 150.

Next, when a voice signal 32 representing a user's voice hailing another participant is inputted from the microphone 120 (S240) into the voice detector 134 and the output controller 160, the instruction signal 40 is outputted from the voice detector 134 to the relative position estimator 136 to instruct the relative position estimator 136 to estimate the relative position 41 of the hailed participant from the imaging device 22.

Then, in the address translator 138, selected is one of the loudspeakers 24 which corresponds to the relative position 41 estimated by the relative position estimator 136, and then the address 38 of the selected loudspeaker 24 is outputted to the output controller 160 (S260). In the address translator 138, the coordinate position of the hailed participant in the spatial coordinate system 48 of the remote location is obtained on the basis of the relative position 41 estimated by the relative position estimator 136. Thus, calculated is a distance between the hailed participant and each loudspeaker 24 in the spatial coordinate system 48, and selected is one of the loudspeakers 24 that is closest to the hailed participant.

Then, from the output controller 160, the voice signal 32 of the user is transmitted to the loudspeaker 24 selected by the address translator 138 (S270). This enables the user's voice to be outputted from the loudspeaker 24 that is closest to the hailed participant.

In summary, in accordance with the instant embodiment, on the basis of the current value of zoom ratio of the imaging device 22, the distance between the hailed participant and the imaging device 22 can be estimated. Furthermore, in accordance with this embodiment, the user's voice can be outputted from one of the loudspeakers 24 which is appropriate for the position of a hailed participant. The distance between a hailed participant and the imaging device 22 can be corrected depending on the volume level of the user's voice.

For example, those control steps processed by the remote communication apparatus 10 not always have to be performed in the temporal order depicted in the flowchart, but may be performed, for example, in the order different therefrom or even partly or entirely in parallel.

Additionally, it should be noted that the above depiction and description do not restrict the remote communication apparatus 10 to an implementation only in the form of hardware but at least a part or the entirety of the apparatus 10 may be implemented by software, i.e. a computer program that enables hardware such as a processor system including a CPU (Central Processor Unit), a ROM (Read-Only Memory) and a RAM (Random-Access Memory) built in the remote communication apparatus 10 to implement the functions similar to those of the above-described constituent elements of the remote communication apparatus 10. In such a case, storage media storing the computer program sequences are also provided.

The entire disclosure of Japanese patent application No. 2009-191349 filed on Aug. 20, 2009, including the specification, claims, accompanying drawings and abstract of the disclosure, is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A remote communication apparatus for receiving an image signal representing an image of a first user captured by an imaging device to show the image to a second user, comprising:
a zoom controller for controlling a zoom ratio defining an angle of view of the imaging device; and
an estimator for estimating a distance between the imaging device and the first user on a basis of the zoom ratio of the imaging device, said estimator estimating the distance between the imaging device and the first user by assuming that the zoom ratio is adjusted so that, if an object of a predetermined size is virtually at a position of the first user, an image of the object acquired by the imaging device would occupy a predetermined range in a whole image acquired by the imaging device;
a coordinate obtainer for using a pan and a tilt angle of the imaging device, and the distance between the imaging device and the first user estimated by said estimator to obtain a coordinate position of the first user in a coordinate system where the imaging device resides;
a sound collector for capturing a voice of the second user;
a plurality of loudspeakers located around the first user; and
an output controller for transmitting the voice captured by said sound collector to at least one of said plurality of loudspeakers,
said output controller holding data of coordinate positions of said plurality of loudspeakers in the coordinate system and transmitting a signal representing the voice captured by said sound collector to one of said plurality of loudspeakers which has a coordinate position that is closest to the coordinate position of the first user obtained by said coordinate obtainer.

2. The apparatus in accordance with claim 1, further comprising a voice detector for detecting a volume level of the voice of the second user captured by said sound collector, said estimator estimating the distance between the imaging device and the first user on a basis of the volume level of the voice of the second user detected by said voice detector in addition to the zoom ratio of the imaging device.

3. A remote communication apparatus for receiving an image signal representing an image of a first user captured by an imaging device to show the image to a second user, comprising:
a zoom controller for controlling a zoom ratio defining an angle of view of the imaging device; and
an estimator for estimating a distance between the imaging device and the first user on a basis of the zoom ratio of the imaging device,
a coordinate obtainer for using a pan and a tilt angle of the imaging device, and the distance between the imaging device and the first user estimated by said estimator to obtain a coordinate range of the first user in a coordinate system where the imaging device resides;
a sound collector for capturing a voice of the second user;
a plurality of loudspeakers located around the first user; and
an output controller for transmitting the voice captured by said sound collector to at least one of said plurality of loudspeakers,
said output controller holding data of coordinate positions of said plurality of loudspeakers in the coordinate system and transmitting a signal representing the voice captured by said sound collector to one of said plurality of loudspeakers which has a coordinate position that is included in the coordinate range obtained by said coordinate obtainer.

4. A remote communication method for receiving an image signal representing an image of a first user captured by an imaging device to show the image to a second user, comprising the steps of:
controlling a zoom ratio defining an angle of view of the imaging device;
estimating a distance between the imaging device and the first user on a basis of the zoom ratio of the imaging device, by assuming that the zoom ratio is adjusted so that, if an object of a predetermined size is virtually at a position of the first user, an image of the object acquired by the imaging device would occupy a predetermined range in a whole image acquired by the imaging device;
using a pan and a tilt angle of the imaging device, and the estimated distance between the imaging device and the first user to obtain a coordinate position of the first user in a coordinate system where the imaging device resides;
capturing a voice of the second user;
providing a plurality of loudspeakers located around the first user; and
transmitting the captured voice to at least one of the plurality of loudspeakers, including holding data of coordinate positions of said plurality of loudspeakers in the coordinate system and transmitting a signal representing the captured voice to one of said plurality of loudspeakers having a coordinate position that is closest to the obtained coordinate position of the first user.

5. The system of claim 4, further comprising a voice detector for detecting a volume level of the captured voice of the second user, said estimator estimating the distance between the imaging device and the first user on a basis of the detected volume level of the voice of the second user in addition to the zoom ratio of the imaging device.

6. A remote communication system comprising:
an imaging device for capturing an image of a first user; and
a remote communication apparatus for receiving the image captured by said imaging device to show the image to a second user,
said remote communication apparatus including:
a zoom controller for controlling a zoom ratio defining an angle of view of said imaging device; and
an estimator for estimating a distance between said imaging device and the first user on a basis of the zoom ratio of said imaging device, said estimator estimating the distance between the imaging device and the first user by assuming that the zoom ratio is adjusted so that, if an object of a predetermined size is virtually at a position of the first user, an image of the object acquired by the imaging device would occupy a predetermined range in a whole image acquired by the imaging device;
a coordinate obtainer for using a pan and a tilt angle of the imaging device, and the distance between the imaging device and the first user estimated by said estimator to obtain a coordinate position of the first user in a coordinate system where the imaging device resides;
a sound collector for capturing a voice of the second user;
a plurality of loudspeakers located around the first user; and an output controller for transmitting the voice captured by said sound collector to at least one of said plurality of loudspeakers, said output controller holding data of coordinate positions of said plurality of loudspeakers in the coordinate system and transmitting a signal representing the voice captured by said sound collector to one of said plurality of loudspeakers which has a coordinate position that is closest to the coordinate position of the first user obtained by said coordinate obtainer.

7. The system in accordance with claim 6, wherein said remote communication apparatus further comprises a voice detector for detecting a volume level of the voice of the second user captured by said sound collector, said estimator estimating the distance between the imaging device and the first user on a basis of the volume level of the voice of the second user detected by said voice detector in addition to the zoom ratio of the imaging device.

8. A remote communication method for receiving an image signal representing an image of a first user captured by an imaging device to show the image to a second user, comprising the steps of:

controlling a zoom ratio defining an angle of view of the imaging device;

estimating a distance between the imaging device and the first user on a basis of the zoom ratio of the imaging device, using a pan and a tilt angle of the imaging device, and the estimated distance between the imaging device and the first user to obtain a coordinate range of the first user in a coordinate system where the imaging device resides;

capturing a voice of the second user;

providing a plurality of loudspeakers located around the first user; and transmitting the captured voice to at least one of the plurality of loudspeakers, including holding data of coordinate positions of said plurality of loudspeakers in the coordinate system and transmitting a signal representing the captured voice to one of said plurality of loudspeakers having a coordinate position that is included in the obtained coordinate range of the first user.

9. The method of claim 8, further comprising detecting a volume level of the captured voice of the second user, said estimating the distance between the imaging device and the first user including estimating the distance between the imaging device and the first user on a basis of the detected volume level of the voice of the second user in addition to the zoom ratio of the imaging device.

10. A remote communication system comprising:

an imaging device for capturing an image of a first user; and a remote communication apparatus for receiving the image captured by said imaging device to show the image to a second user, said remote communication apparatus including:

a zoom controller for controlling a zoom ratio defining an angle of view of said imaging device; and an estimator for estimating a distance between said imaging device and the first user on a basis of the zoom ratio of said imaging device;

a coordinate obtainer for using a pan and a tilt angle of the imaging device, and the distance between the imaging device and the first user estimated by said estimator to obtain a coordinate range of the first user in a coordinate system where the imaging device resides;

a sound collector for capturing a voice of the second user;

a plurality of loudspeakers located around the first user; and an output controller for transmitting the voice captured by said sound collector to at least one of said plurality of loudspeakers, said output controller holding data of coordinate positions of said plurality of loudspeakers in the coordinate system and transmitting a signal representing the voice captured by said sound collector to one of said plurality of loudspeakers which has a coordinate position that is included in the coordinate range obtained by said coordinate obtainer.

11. The system in accordance with claim 10, wherein said remote communication apparatus further comprises a voice detector for detecting a volume level of the voice of the second user captured by said sound collector, said estimator estimating the distance between the imaging device and the first user on a basis of the volume level of the voice of the second user detected by said voice detector in addition to the zoom ratio of the imaging device.

\* \* \* \* \*